United States Patent [19]

Ivy

[11] Patent Number: 4,762,023
[45] Date of Patent: Aug. 9, 1988

[54] VEHICLE DIFFERENTIAL WHICH DISTRIBUTES TORQUE BETWEEN VEHICLE WHEELS IN ACCORDANCE WITH OPERATING DEMANDS

[76] Inventor: Jessie T. Ivy, 686 W. Shore Dr., Anacortes, Wash. 98221

[21] Appl. No.: 73,687

[22] Filed: Jul. 15, 1987

Related U.S. Application Data

[62] Division of Ser. No. 680,651, Dec. 11, 1984, Pat. No. 4,718,304.

[51] Int. Cl.$^4$ ............................................. F16H 1/42
[52] U.S. Cl. ........................................ 74/714; 74/711
[58] Field of Search ............ 74/714, 710, 711, 665 F, 74/665 H, 665 T, 606 R, 710.5

[56] References Cited

U.S. PATENT DOCUMENTS

| | | | |
|---|---|---|---|
| 1,018,535 | 2/1912 | Warner | 74/714 |
| 1,372,381 | 3/1921 | Werts | 180/75 X |
| 1,760,839 | 5/1930 | Drew | 74/714 |
| 1,771,440 | 7/1930 | Jeffries | 180/75 X |
| 1,893,255 | 1/1933 | Tracy | 74/714 |
| 2,786,366 | 3/1957 | Tallakson | 74/714 |
| 2,946,239 | 7/1960 | Hait | 74/710.5 |
| 2,949,792 | 8/1960 | Smith | 74/711 |
| 3,127,791 | 4/1964 | Roe | 74/714 |
| 3,494,226 | 2/1970 | Biddle | 74/714 |
| 3,768,336 | 10/1973 | Wharton | 74/714 |
| 4,245,524 | 1/1981 | Dammon | 74/714 |
| 4,535,651 | 8/1985 | Chambers | 74/714 X |

FOREIGN PATENT DOCUMENTS

D. 18219 4/1956 Fed. Rep. of Germany ........ 74/714

OTHER PUBLICATIONS

"Gleason's Impossible Differential", *Popular Science*, Feb. 1984.

Primary Examiner—Leslie A. Braun
Assistant Examiner—David Novais
Attorney, Agent, or Firm—Donald A. Kettlestrings

[57] ABSTRACT

A vehicle differential which distributes torque between vehicle wheels in accordance with operating demands can be installed in existing differential housings. The differential includes a case which defines a plurality of opening therein. Gear assembly devices are mounted on the exterior of the case with portions projecting into the interior of the case through predetermined ones of the openings, and the gear assembly devices are in meshing relation with axle driving mechanisms for controlling movement of the axle driving mechanisms.

7 Claims, 4 Drawing Sheets

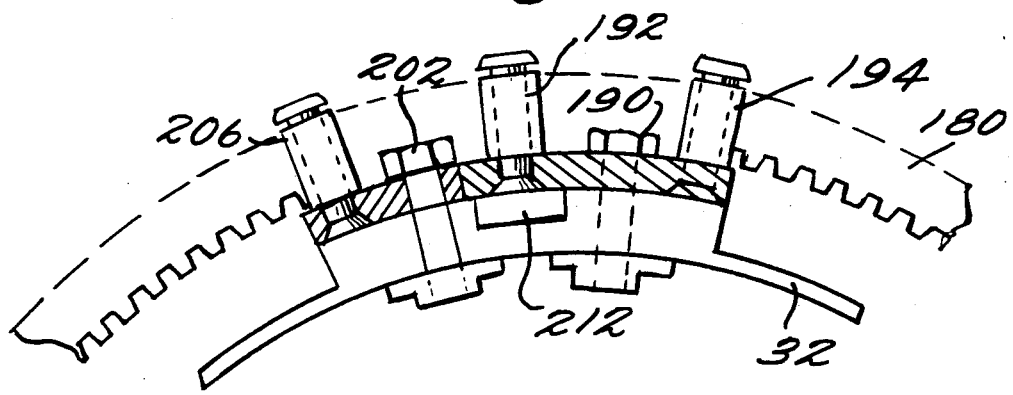
Fig. 4.
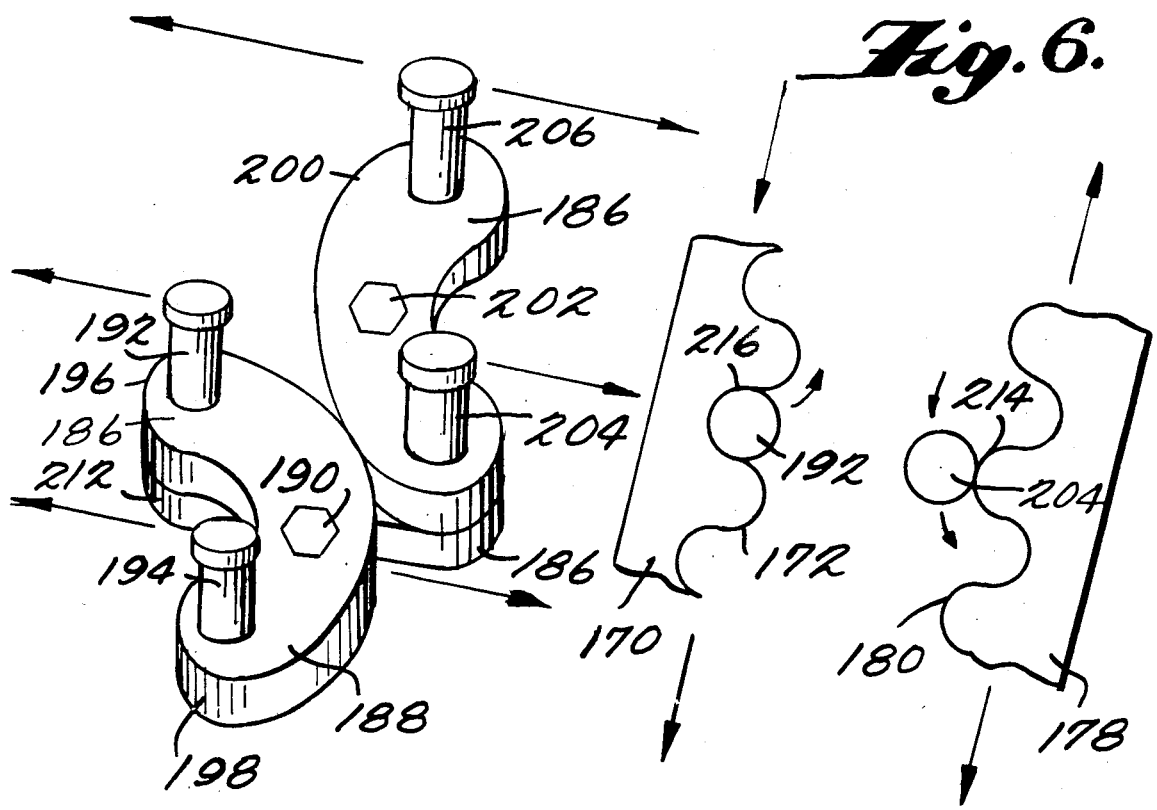
Fig. 5.
Fig. 6.

VEHICLE DIFFERENTIAL WHICH DISTRIBUTES TORQUE BETWEEN VEHICLE WHEELS IN ACCORDANCE WITH OPERATING DEMANDS

This application is a division of pending application Ser. No. 680,651, now U.S. Pat. No. 4,718,304 filed Dec. 11, 1984, for Vehicle Differential Which Distributes Torque Between Vehicle Wheels In Accordance With Operating Demands.

This invention relates to a differential for use in vehicles and more particularly to a vehicle differential which distributes torque in accordance with operating demands.

Many types of vehicle differentials have been developed over the years. Although such differentials have served the purpose, they have not proved entirely satisfactory under all conditions of service for the reason that considerable difficulty has been experienced in properly distributing torque between the vehicle wheels under various types of operating conditions.

It is, therefore, an object of the present invention to provide a unique vehicle differential.

Another object is to provide such a differential which can be installed in present day differential housings.

A further object of the invention is the provision of such a differential which automatically adjusts the torque applied to the vehicle wheels under all types of operating conditions.

Additional objects and advantages of the invention will be set forth in part in the description which follows and in part will be obvious from the description or may be learned by practice of the invention. The objects and advantages are realized and attained by means of the instrumentalities and combinations particularly pointed out in the appended claims.

To achieve these and other objects the present invention provides a differential comprising: a differential case defining a plurality of openings therein; a ring gear attached to the case; a driving pinion gear in meshing relation with the ring gear; left and right axle means disposed in end-to-end relationship with each other and at least partially positioned within the case for connecting with two wheels of the vehicle; axle driving means within the case and in operative relationship with the left and right axle means for selectively rotating the axle means; gear assembly means mounted on the exterior of the case, projecting into the interior of the case through predetermined ones of the openings, and in meshing relation with the axle driving means for controlling movement of the axle driving means; and a substantially oil-tight housing enclosing the previously recited elements.

It is to be understood that both the foregoing general description and the following detailed description are exemplary and explanatory but are not restrictive of the invention.

The accompanying drawings, which are incorporated in and constitute a part of the specification, illustrate examples of preferred embodiments of the invention and together with the description serve to explain the principles of the invention.

FIG. 4 is a fragmentary side elevation view, partly in section, of a portion of the apparatus of FIG. 1;

FIG. 5 is a fragmentary perspective view of bar members in the apparatus of FIG. 1; and FIG. 6 is a fragmentary plan view of a portion of the apparatus of FIG. 1 showing rollers in contact with control gears.

Figure 1:
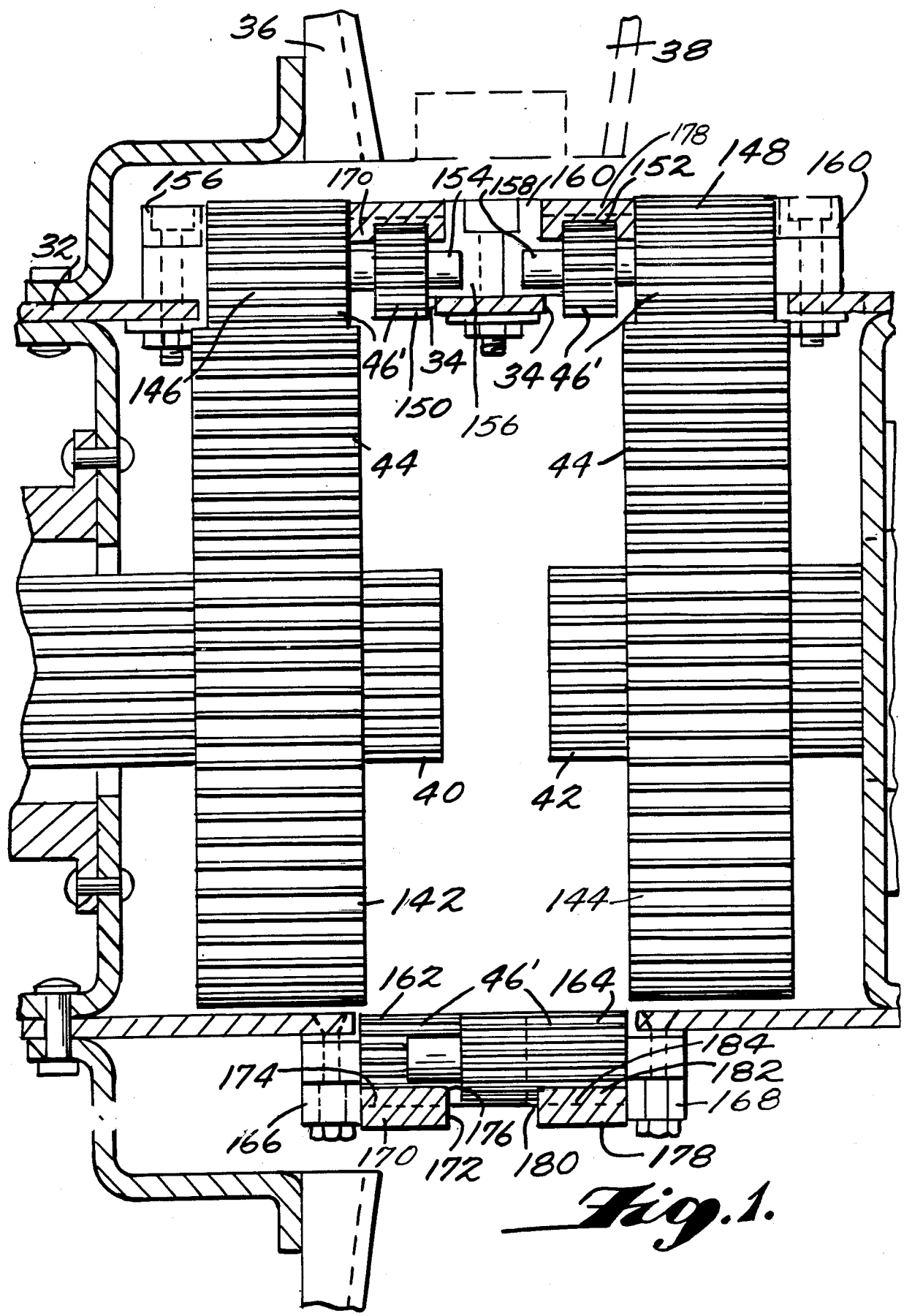
FIG. 1 is a fragmentary top plan view, partly in section, of the invention.
Figure 2:
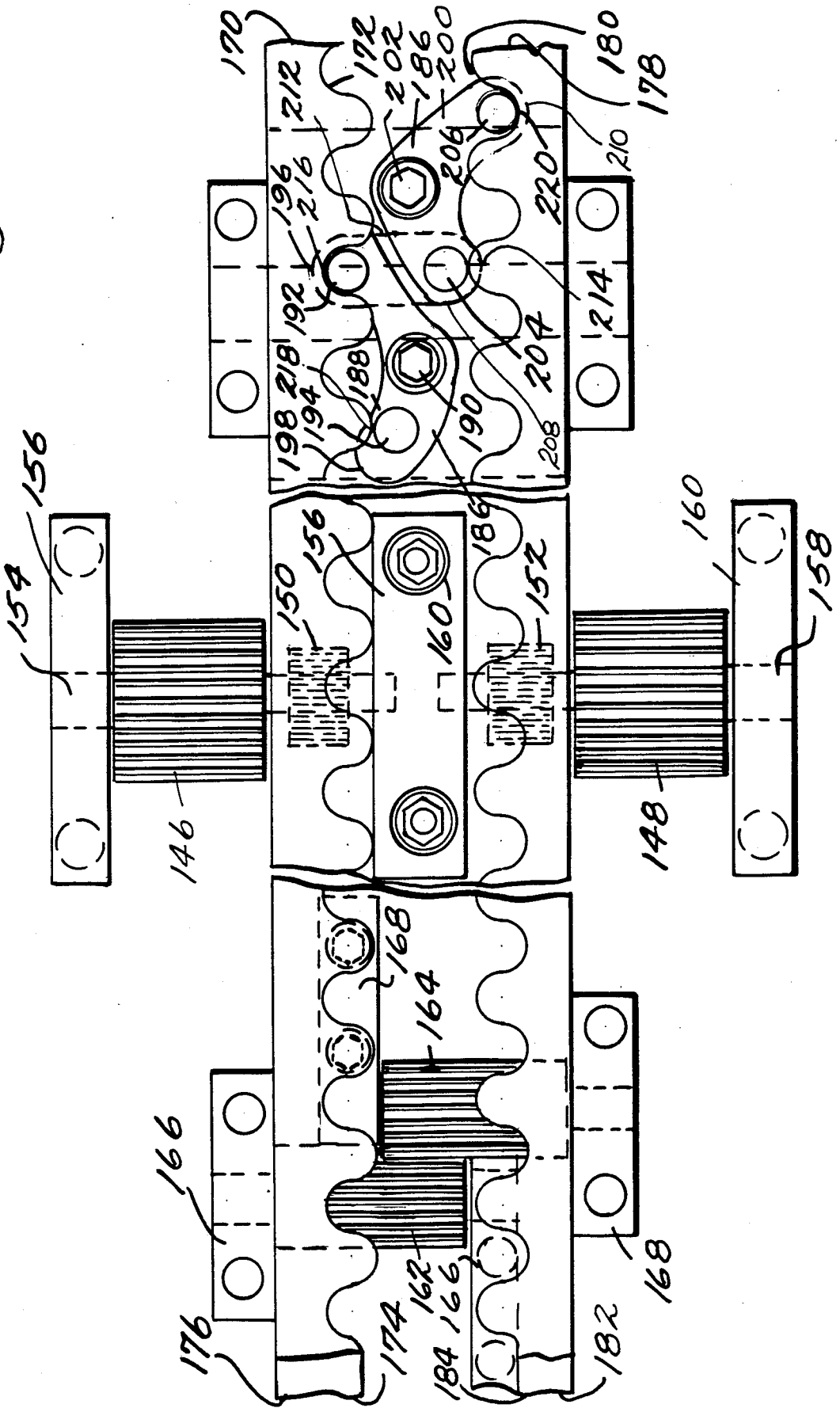
FIG. 2 is a fragmentary top plan view of a different portion of the apparatus of FIG. 1.
Figure 3:
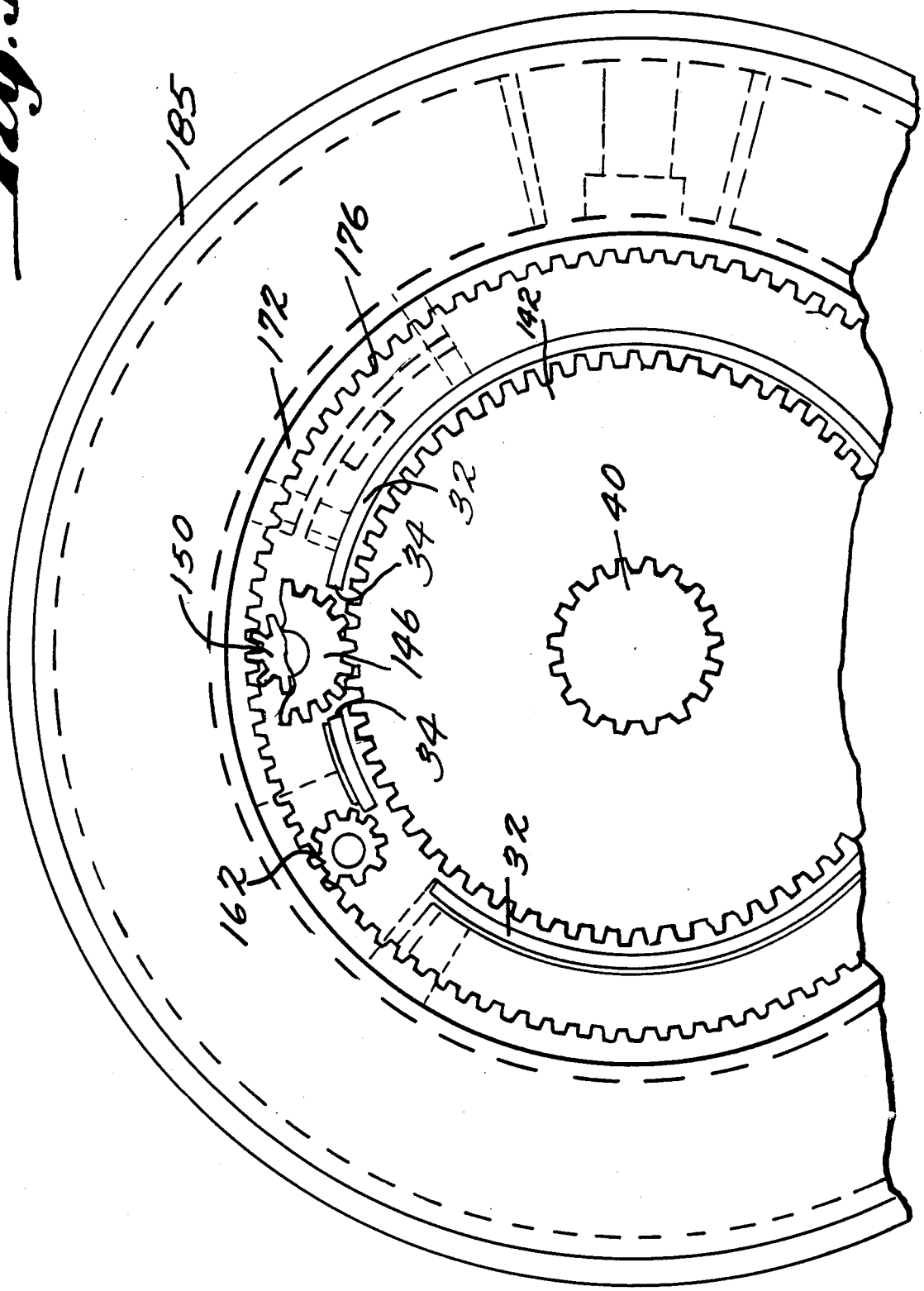
FIG. 3 is a fragmentary side elevation view, partly in section, of the apparatus of FIG. 1.

With reference now to the drawings, wherein like reference characters designate like or corresponding parts throughout the several views, there is shown axle driving means 44 which include left and right driving gears 142, 144 connected, respectively, to left and right axle means 40, 42.

Gear assembly means 46' include left and right large power gears 146, 148 mounted on the exterior of case 32, projecting into the interior of the case through predetermined ones of openings 34, and in meshing relation with left and right driving gears 142, 144, respectively. Gear assembly means 46' include left and right small power gears 150, 152 spaced predetermined distances from left and right large power gears 146, 148, respectively, and a left power gear shaft 154 rigidly connects together left large gear 146 and left small gear 150. Power gear shaft 154 is rotatably mounted on the exterior of case 32 by means of bearings 156. A right power gear shaft 158 rigidly connects together right large power gear 148 and right small power gear 152, and power gear shaft 158 is rotatably mounted on the exterior of case 32 by bearings 160. Left and right supporting gears 162, 164 are rotatably mounted on the exterior of case 32 by means of bearings 166, 168, and gears 162, 164 are in meshing relation with each other.

Gear assembly means 46' further include a left ring control gear 170 having a scalloped side surface 172 and having an inner circumferential periphery surface 174 formed of gear teeth 176. Ring control gear 170 is supported in meshing relationship with left small power gear 150 and with left supporting gear 162. A right ring control gear 178 is also provided which has a scalloped side surface 180 and an inner circumferential periphery surface 182 formed of gear teeth 184. Ring control gear 178 is supported in meshing relationship with right small power gear 152 and with right supporting gear 164. Scalloped side surfaces 172, 180 of ring control gears 170, 178 are located in opposing relationship with each other. Means 186 are also mounted on the exterior of case 32 and in operative relationship with ring control gears 170, 178 for selectively interacting with the ring control gears for controlling their speed of rotation and the speed of rotation of left and right driving gears 142, 144.

Speed controlling means 186 include a first bar member 188 pivotally mounted on the exterior of case 32 by pivot member 190 and adjacent to scalloped side surface 172 of left ring control gear 170. First and second contacting means or rollers 192, 194 are attached adjacent to first and second opposite ends 196, 198 of bar member 188, respectively, for simultaneously contacting scalloped side surface 170.

A second bar member 200 is pivotally mounted by means of pivot member 202 to the exterior of case 32 and is adjacent to scalloped side surface 180 of right ring control gear 178. Second bar member 200 is also mounted adjacent to first bar member 188. Third and fourth contacting means or rollers 204, 206 are attached adjacent to first and second opposite ends 208, 210 of second bar member 200, respectively, for simultaneously contacting scalloped side surface, 180. A linkage member 212 is pivotally attached between first ends 196, 208 of bar members 188, 200.

Bar members 188, 200 are substantially arcuate in shape, and contacting means 192, 194, 204, 206 each include a roller rotatably mounted on its respective bar member.

In accordance with the invention, contacting means 192, 204 are spaced a predetermined distance apart from each other, the distance being substantially equal to the distance between a high point 214 on scalloped side surface 180 of ring control gear 178 and an opposed low point 216 on scalloped side surface 172 of left ring control gear 170.

First contacting means or roller 192 contacts a low point 216 on scalloped side surface 172 of left ring control gear 170 when second contacting means or roller 194 contacts a high point 218 on scalloped side surface 172. Similarly, third contacting means or roller 204 simultaneously contacts a high point 214 on scalloped side surface 180 of right ring control gear 178 when fourth contacting means 206 contacts a low point 220 on scalloped side surface 180.

A plurality of similar speed controlling means 186 may be located at predetermined locations around the exterior of differential case 32.

The ratio of teeth on left small power gear 150 to gear teeth 176 on inner surface 174 of left ring control gear 170 is preferably one to ten, and the ratio of teeth on right small power gear 152 to teeth 184 on inner surface 182 of right ring control gear 178 is also preferably one to ten. The differential is positioned within a conventional oil-tight housing 185.

In operation of the invention, differential pinion gear 38 meshes with ring gear 36. Rotation of pinion gear 38 causes ring gear 36 to rotate, and this causes differential case 32 to rotate with ring gear 36. Ring gear 36 is attached to case 32 in a conventional manner.

Rotation of case 32 causes large power gears 146, 148 and small power gears 150, 152 to move with case 32. If the vehicle is going straight ahead and no differentiation is occurring, power gears 146, 148, 150, and 152 will move in fixed relationship with respect to case 32, and shafts 154, 158 will not rotate.

As a result of the movement of power gears 146, 148 with case 32, left and right driving gears 142, 144 are driven by power gears 146, 148, respectively. Rotation of driving gears 142, 144, in turn, causes rotation of axle means 40, 42, respectively, and the driving wheels (not shown) of the vehicle are rotated.

If the vehicle is making a left-hand turn, for example, differentiation must occur. Left axle 40 must then rotate more slowly than right axle 42. During differentiation, power gears 146, 148 and shafts 154, 158 will rotate relative to case 32 and in directions opposite to one another. Power gears 146, 148 and shafts 154, 158 can only rotate with respect to case 32 in opposite directions to one another because of the meshing action of supporting gears 162, 164.

The rotation of power gears 146, 148 relative to case 32 causes simultaneous rotation of associated small power gears 150, 152. Gears 150, 152 then rotate in directions opposite to one another. This, in turn, causes rotation of ring control gears 170, 178 in directions opposite to each other. The rotation of ring control gears 170, 178 in directions opposite to each other causes rollers 192, 204 on bar members 188, 200 to oscillate back and forth as the rollers ride over the high, and low points of scalloped side surfaces 172, 180 of ring control gears 170, 178.

Simultaneously, rollers 194, 206 of bar members 188, 200 ride over the high and low points of scalloped side surfaces 172, 180. For example, roller 192 contacts low point 216 on scalloped side surface 172 as roller 194 contacts high point 218 of surface 172. Simultaneously, roller 204 of bar member 200 contacts high point 214 on scalloped side surface 180 when roller 206 contacts low point 220 on surface 180.

An oscillating movement of bar members 188, 200 about pivot members 190, 202, respectively, and the engagement of rollers 192, 194, 204 and 206 with scalloped side surfaces 172, 180 slows the rotation of ring control gears 170, 178. This, in turn, slows the rotation of power gears 146, 148 and allows the differential to differentiate enough to allow the vehicle to negotiate sharp turns without allowing ring control gears 170, 178 to rotate around case 32 at a high rate of speed.

As a result, one wheel of the vehicle cannot spin at a high speed while the other remains stationary. Because power gears 146, 148 are much smaller than their associated driving gears 142, 144, the ratio is preferably one to ten, a significant amount of torque is applied to the stationary driving gear and to the stationary vehicle wheel. Therefore, if the left wheel of the vehicle, for example, is on pavement and the right hand wheel of the vehicle is on ice, the right hand wheel would spin, but at a relatively slower speed, and significant torque would be applied to the left hand wheel.

If the vehicle is traveling in a reverse direction and in a straight line, power gears 146, 148 move with case 32 to cause driving gears 142, 144 to rotate the vehicle wheels in a reverse direction. When the vehicle is turning and is moving in a reverse direction, differentiation occurs as previously described.

The invention in its broader aspects is not limited to the specific details shown and described, and departures may be made from such details without departing from the principles of the invention and without sacrificing its chief advantages.

What is claimed is:

1. A differential for a vehicle, said differential comprising:

a differential case defining a plurality of openings therein;

a ring gear attached to said case;

a driving pinion gear in meshing relation with said ring gear;

left and right axle means disposed in end-to-end relationship to each other and at least partially positioned within said case for connecting with two wheels of the vehicle;

axle driving means within said case and in operative relationship with said left and right axle means for selectively rotating said axle means, said axle driving means including left and right driving gears connected, respectively, to said left and right axle means;

gear assembly means mounted on the exterior of said case, projecting into the interior of said case through predetermined ones of said openings, and in meshing relation with said axle driving means for controlling movement of said axle driving means; and a substantially oil-tight housing enclosing the previously recited elements;

said gear assembly means including:

left and right large power gears mounted on the exterior of said case, projecting into the interior of said case through predetermined ones of said openings and in meshing relation with said left and right driving gears, respectively;

left and right small power gears spaced predetermined distances from said left and right large power gears respectively;

a left power gear shaft rigidly connecting together said left large and said left small power gears and rotatably mounted on the exterior of said case;

a right power gear shaft rigidly connecting together said right large and said right small power gears and rotatably mounted on the exterior of said case;

left and right supporting gears rotatably mounted on the exterior of said case and in meshing relation with each other;

a left ring control gear having a scalloped side surface and having an inner circumferential periphery surface formed of gear teeth, said ring control gear supported in meshing relationship with said left small power gear and with said left supporting gear;

a right ring control gear having a scalloped side surface and having an inner circumferential periphery surface formed of gear teeth, said right ring control gear supported in meshing relationship with said right small power gear and with said right supporting gear and said scalloped side surfaces of said ring control gears located in opposing relationship with each other; and means mounted on the exterior of said case in operative relationship with said left and right ring control gears for selectively interacting with said left and right ring control gears for controlling their speed of rotation and the speed of rotation of said left and right driving gears.

2. A differential as in claim 1 wherein said speed controlling means include:

a first bar member pivotally mounted on the exterior of said case and adjacent to said scalloped side surface of said left ring control gear;

first and second contacting means attached adjacent to first and second opposite ends of said first bar member, respectively, for simultaneously contacting said left ring control gear scalloped side surface;

a second bar member pivotally mounted on the exterior of said case and adjacent to said scalloped side surface of said right ring control gear and to said first bar member;

third and fourth contacting means attached adjacent to first and second opposite ends of said second bar member, respectively, for simultaneously contacting said right ring control gear scalloped side surface; and a linkage member pivotally attached between said first ends of said first and second bar members.

3. A differential as in claim 2 wherein said first and third contacting means are spaced a predetermined distance apart from each other, said distance being substantially equal to the distance between a high point on said scalloped side surface of said right ring control gear and an opposed low point on said scalloped side surface of said left ring control gear.

4. A differential as in claim 3 wherein said first contacting means contacts a low point on said scalloped side surface of said left ring control gear when said second contacting means contacts a high point on said scalloped side surface of said left ring control gear, and wherein said third contacting means simultaneously contacts a high point on said scalloped side surface of said right ring control gear when said fourth contacting means contacts a low point on said scalloped side surface of said right ring control gear.

5. A differential as in claim 4 wherein a plurality of said speed controlling means are located at predetermined locations around said differential case.

6. A differential as in claim 5 wherein said first and second bar members are each substantially arcuate and wherein said contacting means each include a roller rotatably mounted on said bar members.

7. A differential as in claim 6 wherein the ratio of teeth on said left small power gear to said gear teeth on said inner surface of said left ring control gear is 1 to 10 and wherein the ratio of teeth on said right small power gear to said gear teeth on said inner surface of said right ring control gear is 1 to 10.

* * * * *